April 26, 1966

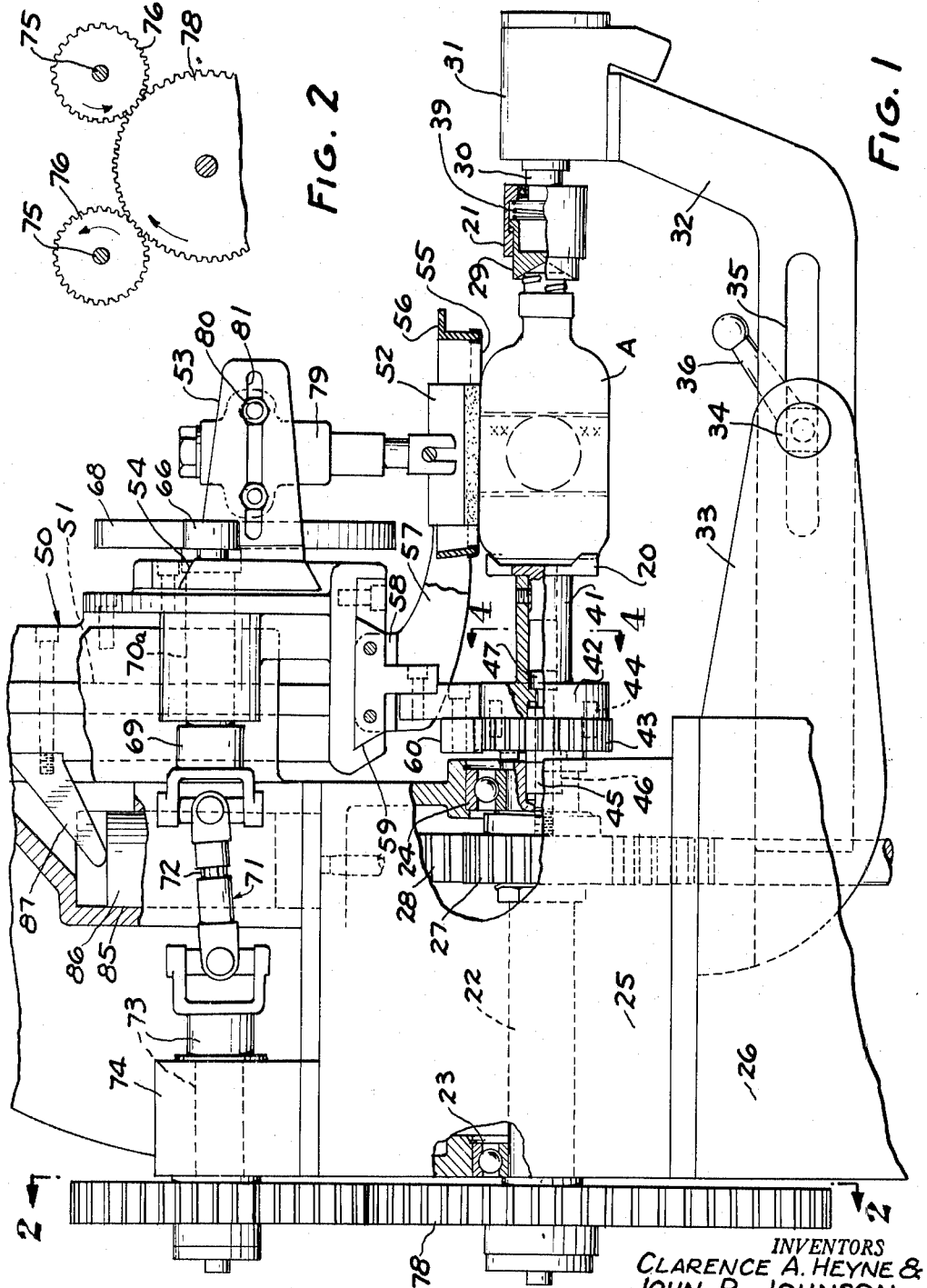

C. A. HEYNE ET AL 3,247,786

ARTICLE DECORATING

Filed July 20, 1961

INVENTORS
CLARENCE A. HEYNE &
JOHN R. JOHNSON
BY J. R. Nelson
and W. A. Schaich
ATTORNEYS INVENTORS
CLARENCE A. HEYNE &
JOHN R. JOHNSON
BY J. R. Nelson and
W. A. Schaich
ATTORNEYS

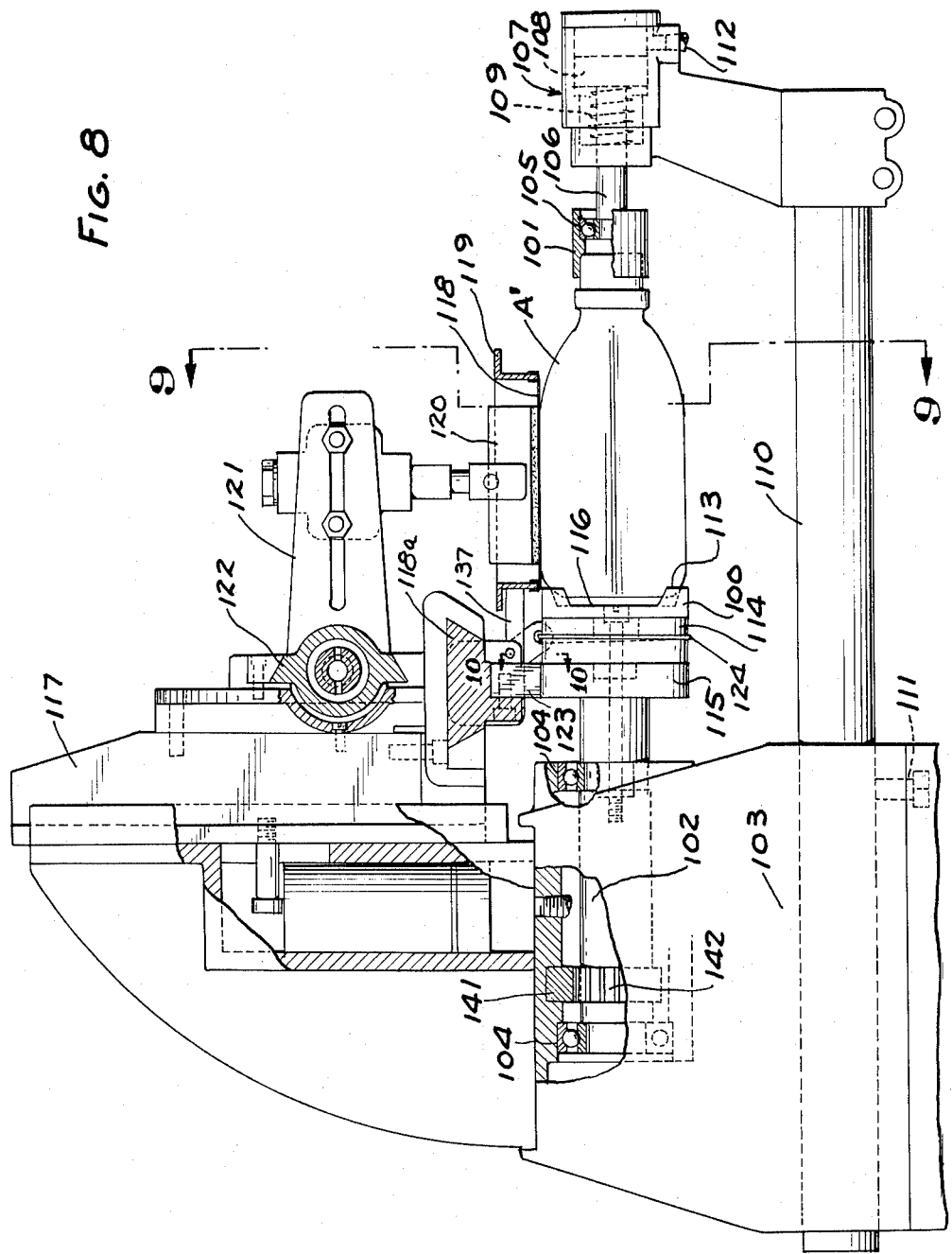

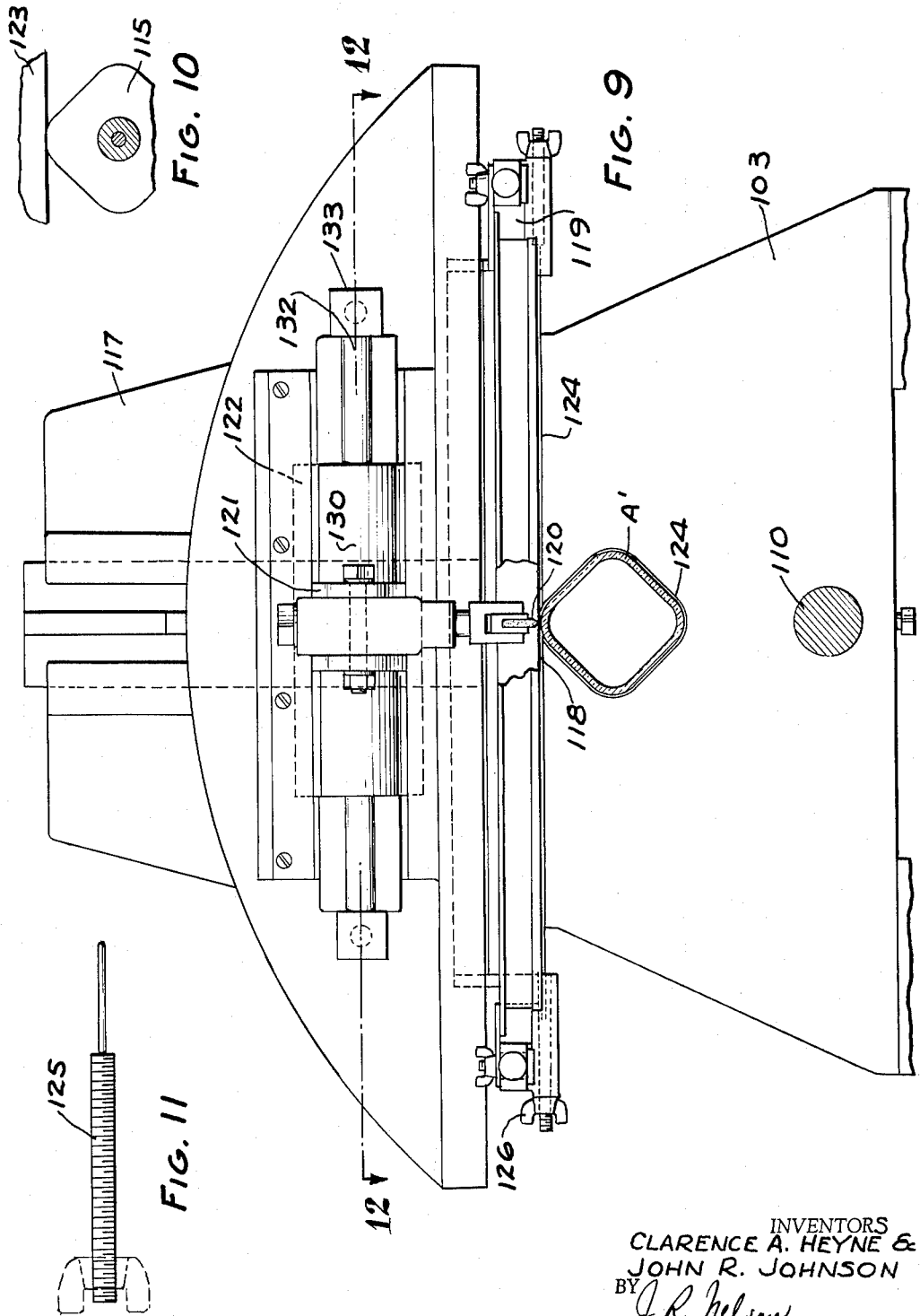

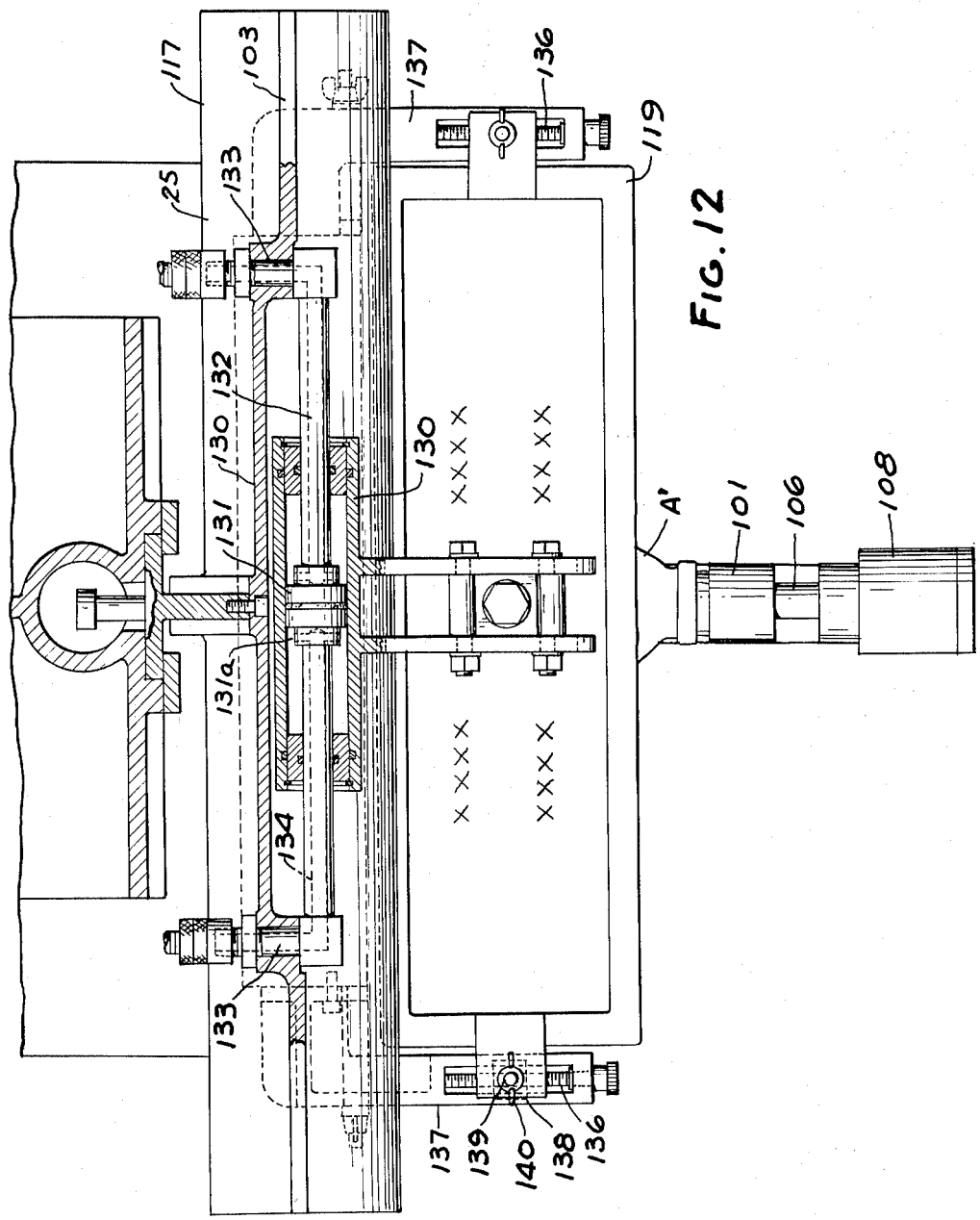

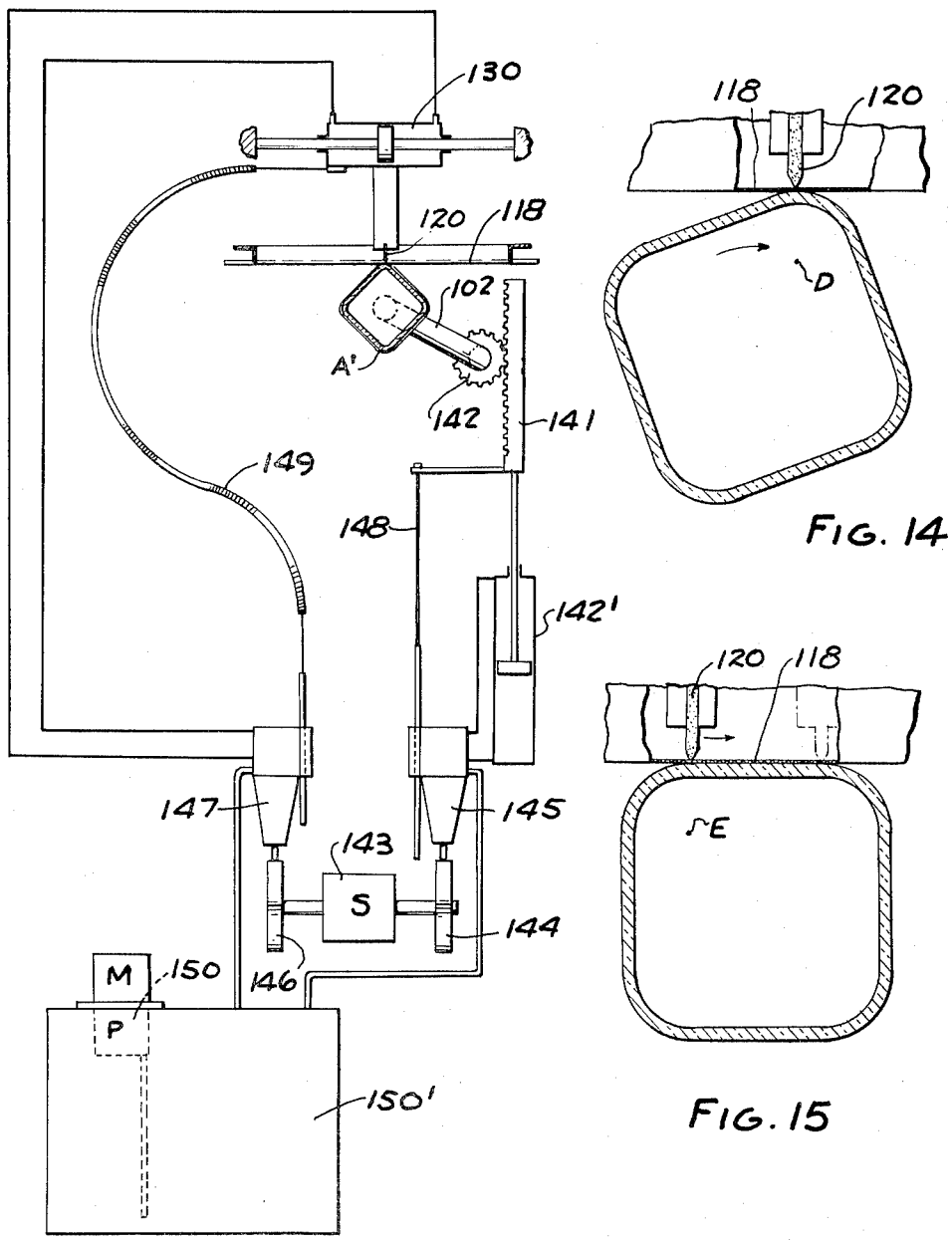

United States Patent Office 3,247,786
Patented Apr. 26, 1966

3,247,786
ARTICLE DECORATING
Clarence A. Heyne and John R. Johnson, Toledo, Ohio, assignors to Owens-Illinois Glass Company, a corporation of Ohio
Filed July 20, 1961, Ser. No. 125,394
25 Claims. (Cl. 101—38)

This invention relates to article decorating and particularly to decorating the external surface of objects such as glass containers, tumblers, bottles and the like which are non-circular in cross section, for example, square and oval containers.

It is an object of this invention to provide a method and apparatus for decorating articles which have a non-circular cross section.

It is a further object of the invention to provide such a method and apparatus wherein substantially the entire periphery of the article can be decorated.

It is a further object of the invention to provide such a method and apparatus wherein accurate registry of the surface decoration is made with the surface of the article.

Basically, the invention comprises continuously rotating the article about its axis, causing a screen and squeegee to move toward and away from the article so that they remain in contact with and follow the contour of the article as it rotates, translating the screen in accordance with the curvature of the article, and moving the squeegee relative to the screen and article in such a fashion that it transfers the decoration to the article.

In the drawings:

FIG. 1 is a fragmentary side elevation of an apparatus embodying the invention, parts being broken away.

FIG. 2 is a partly diagrammatic end view, on a reduced scale, of a part of the gear mechanism of the apparatus shown in FIG. 1.

FIG. 3 is a fragmentary end view of the apparatus shown in FIG. 1, parts being broken away.

FIG. 8 is a fragmentary side elevation of a modified form of apparatus embodying the invention, parts being broken away.

FIG. 9 is a fragmentary sectional view taken along the line 9—9 in FIG. 8.

FIG. 10 is a fragmentary sectional view taken along the line 10—10 in FIG. 8.

FIG. 11 is a fragmentary view of a portion of the apparatus shown in FIG. 9.

FIG. 12 is a fragmentary sectional view taken along the line 12—12 in FIG. 9.

FIG. 13 is a diagrammatic view of the hydraulic circuit for the apparatus shown in FIGS. 8 to 12.

FIG. 14 is a fragmentary sectional view through the container showing the relationship of the container, screen and squeegee at one point in decorating the surface thereof.

FIG. 15 is a fragmentary sectional view similar to FIG. 14 showing the relationship of the container, screen and squeegee at another point in decorating the surface thereof.

Figure 4:
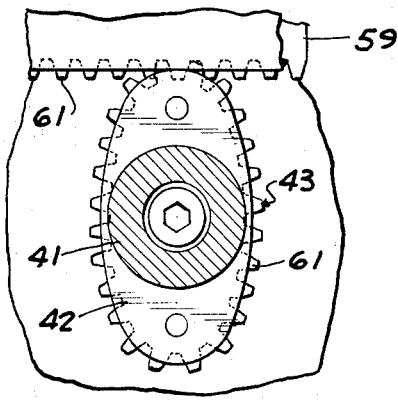
FIG. 4 is a fragmentary sectional view taken along the line 4—4 in FIG. 1.

Referring to FIGS. 1 and 2, the apparatus embodying the invention is adapted to apply a surface decoration to an article A which is of non-circular cross section, herein shown as a glass bottle having an oval cross section. The article A is mounted for rotation about its axis between an axially fixed chuck 20 and an axially movable chuck 21. Chuck 20 is fixed to a shaft 22, as presently described. Shaft 22 is rotatably mounted in bearings 23, 24 in a base 25 that is supported by legs 26. Shaft 22 is driven by a gear 27 fixed thereon and a rack 28 which engages gear 27 and is adapted to be reciprocated by mechanism not shown.

Chuck 21 preferably has a spring loaded engaging member 29 and is supported on a shaft 30 that forms a part of a piston motor 31. Motor 31 is fixed on an arm 32 adjustably supported between a bifurcated extension 33 mounted on base 25. A headed bolt 34 extends through aligned openings in the extension 33 and a slot 35 in arm 32. A handle 36 fixed to a nut 37 is adapted to be manipulated for tightening the nut 37 on the bolt 34 and locking the arm 32 in predetermined position. Application of fluid, such as air to the piston motor 31, retracts the shaft 30 and, in turn, the chuck 21 permitting the container A to be inserted. A spring 39 normally urges the engaging member 29 forwardly.

Figure 3:
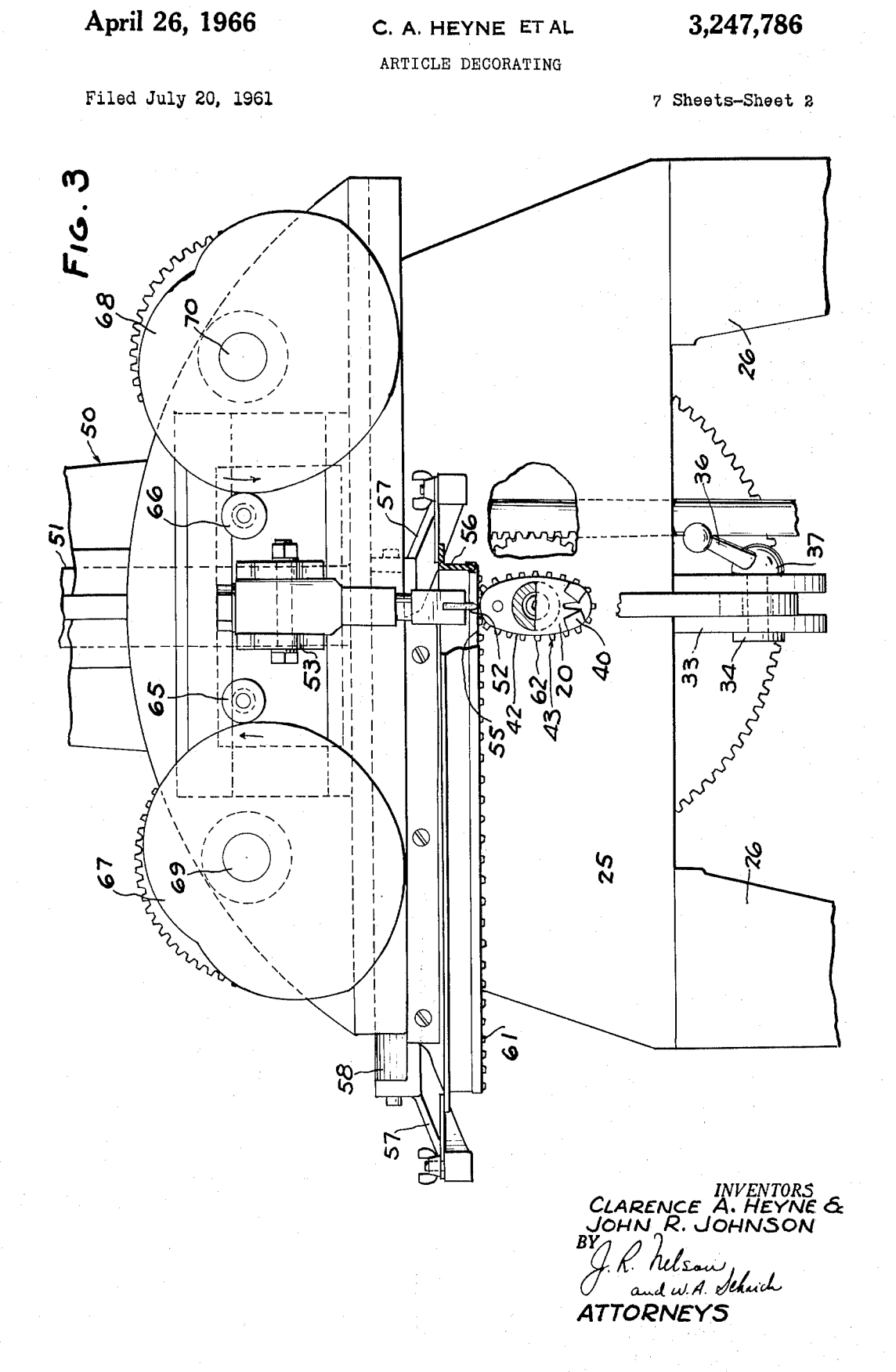

When a container A is to be mounted between chucks 20, 21, it is brought into position and fluid, such as air, is applied to the piston 31 to force the chuck 21 against the end of the container A. As shown in FIG. 3, the end of the other chuck 20 is formed with guides 40 that orient the article A with respect to the chuck 20 and shaft 22 for reasons presently described.

Referring to FIG. 1, chuck 20 includes an integral tubular shaft portion 41 and an integral cam member 42 that has an external configuration identical with the configuration of the article A which is being decorated. Cam member 42 is oriented with respect to the chuck 20 so that corresponding portions of the surface of cam member 42 are at the same rotational position as corresponding portions of the surface of the article A. A gear 43 is positioned between the shaft 22 and the cam member 42. Specifically, as shown in FIG. 1, locating pins 44 extend between cam member 42 and gear 43. In addition, gear 43 includes an integral stub shaft 45 that extends into an opening 46 in shaft 22. A bolt 47 extends through the tubular shaft 41 and aligned openings in the gear 43 and stub shaft 45 and is threaded into the shaft 22 to rigidly connect the chuck, cam member 44, gear 43 and shaft 22. The head of bolt 27 engages a shoulder on cam member 42.

Gear 43 also has an external configuration corresponding to the configuration of the cam members 42 and the article A. As shown in FIGS. 3 and 4, the pitch line of the gear member 43 is at the periphery of the cam member 42 and article A. The periphery of the cam member 42 and the pitch line of the gear 43 are shown as oval corresponding to the oval cross section of the article A.

As shown in FIGS. 1 and 3, a carriage 50 is mounted on base 25 for vertical movement upwardly and downwardly. Specifically, the carriage 50 engages a vertical slideway 51 on the base which overlies the area of the cam member 42 and gear 43. A squeegee 52 is mounted on the bifurcated arms of a slide 53 which, in turn, is mounted for horizontal movement in a dovetail track 54 on the carriage 50. Similarly, a silk screen 55 is mounted in a frame 56 that is supported by arms 57 on a slide 58 that is movable horizontally in a track 59 on the underside of the carriage 50. An elongated cam follower member 42a on slide 58 engages the periphery of cam member 42 so that as shaft 22 is rotated, carriage 50 is moved upwardly and downwardly in accordance with the configuration of the cam member 42 and the article A. In this manner, movement of the carriage upwardly and downwardly moves the screen 55 and squeegee 52 upwardly and downwardly toward and away from the container A. At the same time, the screen 55 and squeegee may be moved horizontally and independently of one another on the carriage 50.

As the article A is rotated about its axis by rotation of the shaft 22, the screen 55 is caused to move and maintain a line contact with the surface of the article A. The screen is moved upwardly and downwardly by movement of the carriage 50. The screen is moved horizontally at a variable rate by means of a horizontal rack 60 fixed to the slide 58 and having teeth 61 that engage the teeth 62 on the non-circular gear 43 (FIGS. 3 and 4). Thus, as the article A is rotated, the screen 55 is moved horizontally at a variable rate corresponding with the peripheral speed of the surface of the article with which the screen is in contact so that there is no relative movement between the container and the screen at the area of contact. For example, if the peripheral speed of the container surface is large, then the screen is moved at a higher rate.

In order to achieve a satisfactory printing of the noncircular article, the squeegee 52 is moved horizontally independently of the screen 55 as the article A is rotated. This movement is achieved, as shown in FIG. 3, by cam follower rollers, 65, 66 on slide 53. Cam follower rollers 65, 66 engage cams 67, 68, respectively, each of which is rotatably mounted about a horizontal axis on carriage 50. Cams 67, 68 are of complementary configuration so that they tend to urge the slide 53 and, in turn, the squeegee 52 in the same direction.

Cams 67, 68 are adapted to be driven by rotation of the shaft 22. As shown in FIG. 1 each cam is mounted on shaft 69, 70, respectively, that is rotatably mounted in a hub 70a on the carriage. A double universal joint 71 including a splined connection 72 connects each shaft 69, 70 to its respective short shaft 73. Each shaft 73 is journalled in a hub 74 on the base 25. As shown in FIG. 2, the shaft 75 which extends to cam 67 and the shaft 75 that extends to cam 68 have gears 76, 77 thereon that are meshed with a gear 78 fixed to the shaft 22. When the gear 78 is rotated, the cams 67, 68, in turn, are rotated in the same direction causing the slide 53 and, in turn, the squeegee 52 to be translated horizontally on the carriage 50. As shown in FIG. 1, the squeegee is fixed to a bracket 79 that is adjustably mounted on the arms of slide 53 by bolts 80 that extend through slots 81 on the arms of the slide 53.

Figure 5:
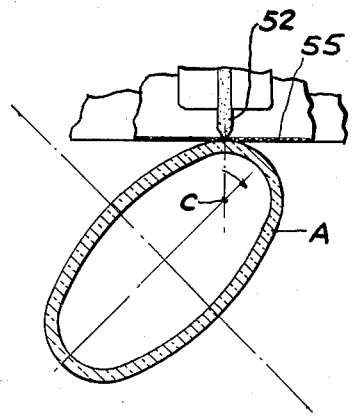
FIG. 5 is a fragmentary sectional view through the container showing the relationship of the container, screen and squeegee at one point in decorating the surface thereof.
Figure 6:
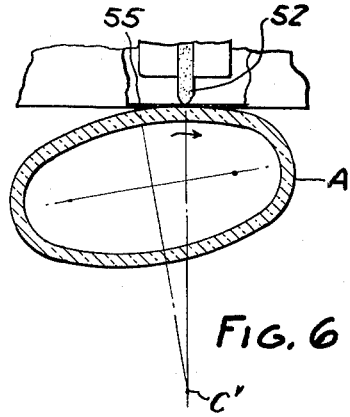
FIG. 6 is a view similar to FIG. 5 showing the relationship of the container, screen and squeegee at another point in decorating the surface thereof.

The configuration of the cams 67, 68 is such that the squeegee 52 is always maintained in a plane containing the radius of the portion of the container that is being contacted. For example, as shown in FIGS. 5 and 6, when the squeegee 52 is in contact with the area of sharper radius, it is caused to be moved as the container rotates so that it lies in a plane extending through the center C corresponding to the center of curvature of the portion of greater curvature or the shorter radius. As the container is further rotated, the squeegee 52 is moved so that it continuously lies in a plane extending through the center C' corresponding to the center of the radius of curvature of the lesser curved portion of the container. Thus, as the container is rotated, the squeegee is moved back and forth across the axis of the container to maintain the squeegee in a plane extending through the radius of curvature of the surface contacted by the squeegee.

Figure 7:
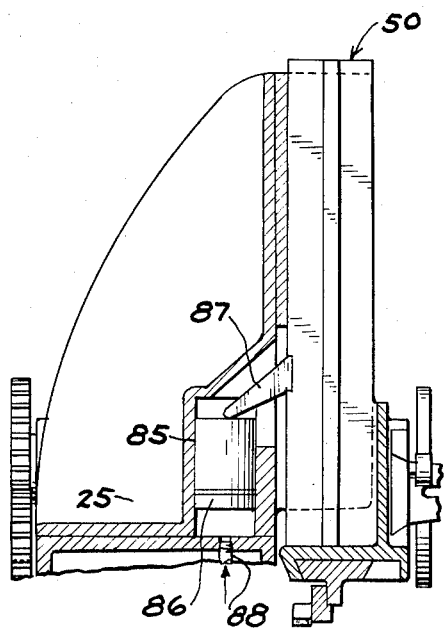
FIG. 7 is a fragmentary sectional view, on a reduced scale, of a portion of the apparatus shown in FIG. 1.

As shown in FIGS. 1 and 7, in order to facilitate the movement of the carriage 50 up and down, a counterbalancing cylinder 85 is provided on the base 25 and a piston 86 is mounted in the cylinder and is adapted to engage a projection 87 on the carriage 50. Fluid, such as air, supplied to an inlet 88 forces the piston 86 upwardly to engage the projection 87 and urge the carriage 50 upwardly to counterbalance the weight thereof and minimize the friction between the cam follower 42a and the cam member 42.

A modified form of the apparatus is shown in FIGS. 8 to 15 and comprises an axially fixed chuck 100 and an axially movable chuck 101. The chucks 100, 101 are adapted to grip and hold an article A', herein shown as being a bottle having a square cross section, for rotation about a horizontal axis. Chuck 100 is fixed as presently described to a shaft 102 that is rotatably mounted in base 103 by bearings 104. Axially movable chuck 101 is rotatably mounted by a bearing 105 on a shaft 106 of a piston motor 107. The piston 108 of motor 107 is yieldingly urged outwardly away from the article A' by a spring 109. The piston motor 107 is, in turn, mounted on a shaft 110 that is adjustably mounted on base 103. When an article A' is to be gripped, air is supplied through inlet 112 to the piston motor 107 urging the chuck 101 inwardly to grip the article. Chuck 100 is provided with projections 113 that orient the article A' circumferentially with respect to the chuck 100.

An extension member 114 is provided adjacent chuck 100. A cam member 115 having the identical external configuration as the external surface of the article A' is provided adjacent the member 114. The members 114, 115 are, in turn, fastened to the end of shaft 102 by a screw 116 extending therethrough and threaded into the shaft.

As in the previous form of the invention, a carriage 117 is provided on the base 103 for vertical movement upwardly and downwardly. A screen 118 mounted on a frame 119 is fixed on a slide 118a on the underside of the carriage 117, as presently described, for movement horizontally relative to the carriage 117. A squeegee 120 is adjustably mounted on a bracket 121 that forms a part of a slide 122 that is movable horizontally on the carriage.

As in the previous form of the invention, the carriage 117 is moved upwardly and downwardly by contact of a follower 123 with the surface of the cam member 115 (FIGS. 8, 10). This moves the screen 118 and squeegee 120 up and down toward and away from the article A'.

The movement of the screen horizontally is achieved, as shown in FIGS. 8 and 9, by a cable 124 that is wound around the extension member 114 at least once and has its ends fixed to the frame 119. The ends of the cable are preferably provided with threaded members 125 that extend through openings in the frame and a wing nut 126 is threaded on the members 125 (FIG. 11). When the cable 124 is wound around the member 114, the longitudinal axis or center of the cable defines a cross section which is identical to the cross sectional configuration of the article A', that is, the surface of the member 114 is similar but slightly less in dimension than the cross section of the article A' by an amount equal to the diameter of the cable. By this arrangement, as the article A' is rotated, the screen 118 is moved at a variable rate which corresponds to the peripheral speed of the surface of the article which is being contacted by the screen so there is no relative movement between the container and the screen at the area of contact.

The apparatus for moving the squeegee horizontally at a variable rate comprises a cylinder 130 that forms part of the slide 122 (FIGS. 9, 12). A piston 131 within the cylinder has a hollow piston rod 132 that projects beyond each end of the cylinder with the ends of the rod 132 fixed to hollow shafts 133 on base 103. Fluid is adapted to be selectively provided to the hollow shafts 133 and, in turn, through the hollow rod 132 and through an opening 134 in the hollow rod 132, lateral openings 131a in the hub of piston 131 to each side of the piston 131 so that the cylinder 130 is moved horizontally to move the squeegee at a variable rate.

As shown in FIG. 12, the screen frame 119 can be adjusted longitudinally of the article by an arrangement which includes threaded shafts 136 journalled in brackets 137 on slide 118a and blocks 138 riding thereon to which the frame 119 is connected by wing nuts 139 threaded on screws 140 projecting upwardly from the blocks. Rotation of the threaded shafts 136 translates the frame longitudinally with respect to the article A'.

The movement of the squeegee 120 in this form of the invention is in a manner similar to that described with the form of the invention shown in FIGS. 1 to 7, that is, such as to maintain the squeegee 120 in the plane containing the radius of curvature of the portion of the article which is being contacted. For example, as shown in FIG. 14, the squeegee 120 is maintained in the plane containing the radius of curvature of the sharply curved portion of the container shown at D. As the container further rotates and the screen comes into contact with the flat portion of the article having an infinite radius, the squeegee is caused to move rapidly across the surface of the article and is maintained normal with the flat surface. As the container is further rotated, the squeegee is moved toward the right, as shown by the arrow in FIG. 15, to maintain the squeegee in the plane of the radius of curvature of the next sharply curved portion, namely, that portion having its center at E. As the article A' rotates, the squeegee reciprocates back and forth at a variable rate to maintain the required relationship.

FIG. 13 is a diagrammatic view of a hydraulic mechanism for operating the apparatus shown in FIGS. 8 to 12. As shown in FIG. 8, the shaft 102 is adapted to be driven by a rack 141 that moves horizontally in the base 103 and engages a gear 142 on the shaft 102. In the form of the invention shown in FIG. 13, the rack 141 is adapted to be moved by a piston motor 142'. A motor, such as an electric motor 143, drives a housing cam 144 that, in turn, operates a servo valve 145 supplying fluid to the piston motor 142 to translate the rack 141, and rotate gear 142 and shaft 102 and article A'. This also drives the screen 117 at the desired variable rate. A second timing cam 146 driven by the motor 143 operates a second servo valve 147 which alternately supplies fluid at the desired rate to the cylinder 130 for moving the squeegee. In order to wipe out or erase the signal produced by the cams 144, 146, a follow up drive is provided. As shown in FIG. 13, this comprises a rod 148 driven by the rack 141 and extending to the servo valve 145 and a cable 149 driven by the cylinder 130 and extending to the servo valve 147. As timing cams 144, 146 cause a movement the follow-up drives cross out or erase the signal in a manner well known in the art. As further shown in FIG. 13, fluid is supplied to the servo valves 145, 147 from a tank 150 by a pump 151.

We claim:

1. An apparatus for decorating the surface area of non-circular articles which area has adjacent portions thereof with different radii of curvature which comprises means for supporting and rotating the article about its axis, a screen, means for mounting the screen for movement toward and away and for translation relative to the article, a squeegee, means for mounting the squeegee for movement toward and away and translation relative to the article, interconnecting means between the article rotating means and the screen and squeegee for moving the screen and squeegee toward and away from the article to maintain the squeegee in contact with the screen and the screen in contact with said surface area during rotation of the article, interconnecting means between the article rotating means and the screen for translating the screen along said surface area of the article as the article rotates, and interconnecting means between the article rotating means and the squeegee for translating the squeegee back and forth in such a manner that the squeegee is maintained in contact with the screen and in alignment with the radius of curvature of said surface area of the article.

2. The combination set forth in claim 1 wherein said interconnecting means between said article rotating means and said squeegee includes a cam mounted for rotation about the axis of the article and having the same contour as the contour of the external surface of the article.

3. The combination set forth in claim 1 wherein said interconnecting means between said article rotating means and said screen comprises a member having an external contour identical to the external contour of the article and drive means interconnecting the external surface of said member with said screen.

4. The combination set forth in claim 3 wherein said drive means interconnecting the external surface of said member and said screen comprises a rack on said screen and interengaging teeth on the surface of said member.

5. The combination set forth in claim 3 wherein said drive means interconnecting said member and said screen comprises a cable wound around the surface of said member and having the ends thereof connected to spaced points adjacent the ends of the screen.

6. The combination set forth in claim 1 wherein said interconnecting means between said article rotating means and said squeegee comprises at least one cam operatively driven by said article rotating means, and a cam follower connected to said squeegee and engaging the periphery of said cam.

7. The combination set forth in claim 1 wherein said interconnecting means between said article rotating means and said squeegee comprises a timing cam operatively connected to said article rotating means, a piston motor connected to said squeegee for translating said squeegee, and a servo valve actuated by said cam and controlling the operation of said piston motor.

8. An apparatus for decorating the surface area of a non-circular article which area has adjacent portions thereof with different radii of curvature which comprises means for rotating the article about its axis, a screen, means for mounting the screen for translating movement relative to the article, a squeegee, means for mounting the squeegee for translating movement relative to the screen and the article, means for translating the screen as the article rotates causing progressive portions of the screen to contact progressive portions of the surface area of the article, said means operating at a variable rate corresponding to the peripheral speed of the surface of the article at the area contacted by said screen so that there is no relative movement between the container and the screen at the area of contact, and means for translating said squeegee back and forth as the article rotates to maintain the squeegee in contact with the screen and in alignment with a plane containing the radius of curvature of the portion of the surface which is contacted.

9. An apparatus for decorating the surface area of a non-circular article which area has adjacent portions thereof with different radii of curvature which comprises means for rotating the article about its axis, a carriage, means for mounting the carriage for movement toward and away from the article, a screen, means for mounting the screen on the carriage for translating movement relative to the article, a squeegee, means for mounting the squeegee on the carriage for translating movement relative to the screen and the article, interconnecting means between said article rotating means and said carriage for moving said carriage toward and away from the article to maintain the squeegee in contact with the screen and the screen in contact with said surface area during rotation of the article, means for translating the screen as the article rotates causing progressive portions of the screen to contact progressive portions of the surface area of the article, said means operating at a rate corresponding to the peripheral speed of the surface of the article contacted by the screen so that there is no relative movement between the container and the screen at the area of contact, and means for translating said squeegee back and forth as the article rotates to maintain the squeegee in contact with the screen and in alignment with a plane containing the radius of curvature of the portion of the surface which is contacted.

10. The combination set forth in claim 9 wherein said means for moving said carriage toward and away from said article comprises a cam mounted for rotation about the axis of the article, said cam having a configuration identical to the configuration of the external surface of the article, and means on said carriage engaging said cam and causing said carriage to follow the contour of said cam as the cam is rotated.

11. The combination set forth in claim 9 wherein said means for translating said screen comprises a member mounted for rotation about the axis of the article and having a configuration identical to the configuration of the external surface of the article, teeth on said member, and a rack connected to said screen and engaging said teeth.

12. The combination set forth in claim 9 wherein said means for translating said screen comprises a member mounted for rotation about the axis of the article, a cable wound around said member and having the end thereof connected to the ends of said screen, said member having a configuration substantially identical to the configuration of the external surface of the article such that when the cable is wound on said member the diametral center of said cable defines a configuration of identical cross section as said article.

13. The combination set forth in claim 9 wherein said means for translating said squeegee comprises a pair of cams, and cam followers on said squeegee mounting mechanism engaging said cams and adapted to translate said squeegee as the cams are rotated.

14. The combination set forth in claim 9 wherein said means for rotating said article comprises a piston motor, a timing cam, a servo valve operated by said cam for controlling said piston motor.

15. The combination set forth in claim 14 wherein said means for translating said screen comprises a piston motor, a second timing cam, and a servo valve controlled by said second cam for operating said second piston motor.

16. An apparatus for decorating the surface area of an article having a non-circular cross sectional configuration which area has adjacent portions thereof with different radii of curvature which comprises a base, chuck means on said base for supporting said article horizontally for rotation about its axis, means for rotating said article, a carriage mounted on said base for movement vertically toward and away from said article, a screen, means for mounting said screen on said carriage in overlying relation to said article and for movement horizontally relative to said carriage, a squeegee, means for mounting said squeegee on said carriage in overlying relation to said screen and said article and for movement horizontally relative to said carriage, a cam member mounted on said chuck means and adapted to rotate therewith, said cam member having an external configuration identical to the external configuration of the article, said carriage having a portion engaging the upper surface of said cam member, whereby upon rotation of said cam member, said carriage is moved upwardly and downwardly in accordance with the contour of the article to maintain the squeegee in contact with the screen and the screen in contact with said surface area during rotation of the article, a second member mounted on said chuck means for rotation therewith, said second member having a configuration substantially identical to the configuration of the article being decorated, and means interconnecting said second member with said screen for translating said screen horizontally and causing said screen to move along the surface of the article as the article is rotated, and means for moving said squeegee back and forth independently of said screen to maintain said squeegee in contact with said screen along a line lying in a plane containing the radius of curvature of the surface of the article.

17. The combination set forth in claim 16 wherein said means interconnecting said second member with said screen comprises a horizontal rack fixed to said screen and adapted to move horizontally with said screen, and teeth on the periphery of said member engaging said rack.

18. The combination set forth in claim 16 wherein said means interconnecting said second member with said screen comprises a cable wound around said second member at least once and having the ends thereof extending horizontally and connected to the extremities of said screen.

19. The combination set forth in claim 16 wherein said means for moving said squeegee horizontally comprises a pair of cam members mounted on said carriage for rotation about horizontal axes, means interconnecting said cam members to said article rotating means, and cam follower rollers on said squeegee mounting means.

20. The combination set forth in claim 16 including fluid operated counterbalancing means for said carriage.

21. An apparatus for decorating the surface area of an article having a non-circular cross sectional configuration which area has adjacent portions thereof with different radii of curvature which comprises a base, chuck means on said base for supporting said article horizontally for rotation about its axis, means for rotating said article, a carriage mounted on said base for movement vertically toward and away from said article, a screen, a first slide mounted on said carriage for movement horizontally relative to said carriage, means for mounting said screen on said first slide in overlying relation to said article, a squeegee, a second slide mounted on said carriage for movement horizontally relative to said carriage, means for mounting said squeegee on said second slide in overlying relation to said screen and said article, a cam member mounted on said chuck means and adapted to rotate therewith, said cam member having an external configuration identical to the external configuration of the article, said carriage having a portion engaging the upper surface of said cam member, whereby upon rotation of said cam member, said carriage is moved upwardly and downwardly in accordance with the contour of the article to maintain the squeegee in contact with the screen and the screen in contact with said surface area during rotation of the article, a second member mounted on said chuck means for rotation therewith, said second member having a configuration identical to the configuration of the article being decorated, and means interconnecting said second member with said first slide for translating said screen horizontally and causing said screen to move along the surface of the article as the article is rotated, and means for moving said second slide independently of said screen to maintain said squeegee in contact with said screen and in a plane containing the radius of curvature of the surface of the article.

22. The method of decorating the surface area of a non-circular article which area has adjacent portions thereof with different radii of curvature by using a screen and squeegee which comprises the steps of rotating the article about its axis, moving the squeegee and screen generally radially toward and away from the article as the article is rotated so that the squeegee and screen continue to remain in contact with one another and the screen remains in contact with the article and follows the contour of the article, translating the screen as the article rotates at a lesser rate at the portions of the article which have a lesser peripheral speed and at a greater rate at the portions of the article which have a greater peripheral speed so that there is no relative movement between the container and the screen at the area of contact, moving the squeegee during movement of the screen and rotation of the article relative to the screen and article and translating the squeegee in the reverse direction relative to the screen and article at the transition from the portion of one radius of curvature to the portion of the other radius of curvature in such a manner that the squeegee is maintained in contact with the screen at the point of contact of the screen with the article and in alignment with the radius of curvature of the article at said point of contact.

23. The method of decorating the surface area of a non-circular article which area has adjacent portions thereof with different radii of curvature by using a flat screen and squeegee which comprises the steps of rotating the article about its axis, moving the squeegee and screen generally radially toward and away from the article as the article is rotated so that the squeegee and screen continues to remain in contact with one another and the screen remain in contact with the article and follows the contour of the article, translating the screen in its plane as the article rotates at a lesser rate at the portions of the article which have a lesser peripheral speed and at a greater rate at the portions of the article which have a greater peripheral speed so that there is no relative movement between the container and the screen at the area of contact, moving the squeegee during movement of the screen and rotation of the article relative to the screen and article and translating the squeegee in the reverse direction relative to the screen and article at the transition from the portion of one radius of curvature to the portion of the other radius of curvature in such a manner that the squeegee is maintained in contact with the screen at the point of contact of the screen with the article and in alignment with the radius of curvature of the article at the point of contact.

24. The method of decorating the surface area of a non-circular article which area has adjacent portions thereof with different radii of curvature by using a flat screen and squeegee which comprises the steps of rotating the article about its axis, moving the squeegee and screen generally radially toward and away from the article as the article is rotated so that the squeegee and screen continue to remain in contact with one another and the screen remains in contact with the article and follows the contour of the article, translating the screen in its plane as the article rotates at a lesser rate at the portions of the article which have a lesser peripheral speed and at a greater rate at the portions of the article which have a greater peripheral speed so that there is no relative movement between the container and the screen at the area of contact, moving the squeegee during movement of the screen and rotation of the article relative to the screen and article and translating the squeegee in the reverse direction relative to the screen and article at the transition from the portion of one radius of curvature to the portion of the other radius of curvature back and forth across the axis of curvature of the transition in such a manner that the squeegee is maintained in contact with the screen at the point of contact of the screen with the article and the plane of the squeegee is in alignment with the radius of curvature of the article at the point of contact.

25. An apparatus for decorating the surface area of non-circular articles which area has adjacent portions thereof with different radii of curvature which comprises means for supporting and rotating the article about its axis, a screen, means for mounting the screen for movement toward and away and for translation relative to the article, a squeegee, means for mounting the squeegee for movement toward and away and translation relative to the article, interconnecting means between the article rotating means and the screen and squeegee for moving the screen and squeegee toward and away from the article to maintain the squeegee in contact with the screen and the screen in contact with said surface area during rotation of the article, interconnecting means between the article rotating means and the screen for translating the screen along said surface area of the article as the article rotates, and cam-controlled interconnecting means between the article rotating means and the squeegee for translating the squeegee back and fourth in such a manner that the squeegee is maintained in contact with the screen and in alignment with the radius of curvature of said surface area of the article.

References Cited by the Examiner
UNITED STATES PATENTS

| | | | |
|---|---|---|---|
| 2,219,603 | 10/1940 | Shurley | 101—124 |
| 2,312,322 | 3/1943 | Dalton | 101—124 |
| 2,383,947 | 9/1945 | Wensel | 101—123 |
| 2,881,699 | 4/1959 | Hakogi | 101—126 |
| 2,972,943 | 2/1961 | Velonis | 101—124 |
| 2,987,992 | 6/1961 | Velonis | 101—126 |

ROBERT E. PULFREY, *Primary Examiner.*